US012199993B2

(12) United States Patent
Tav et al.

(10) Patent No.: US 12,199,993 B2
(45) Date of Patent: Jan. 14, 2025

(54) HIGHLY COLLABORATIVE DECEPTIVE NETWORK ALLIANCE

(71) Applicant: INTERNATIONAL BUSINESS MACHINES CORPORATION, Armonk, NY (US)

(72) Inventors: Doga Tav, Fredericton (CA); Russell Couturier, Worcester, MA (US); Ronald Williams, Austin, TX (US); Jeb R. Linton, Manassas, VA (US)

(73) Assignee: International Business Machines Corporation, Armonk, NY (US)

(*) Notice: Subject to any disclaimer, the term of this patent is extended or adjusted under 35 U.S.C. 154(b) by 214 days.

(21) Appl. No.: 17/808,554

(22) Filed: Jun. 24, 2022

(65) Prior Publication Data

US 2023/0421576 A1 Dec. 28, 2023

(51) Int. Cl.
 *H04L 9/40* (2022.01)
(52) U.S. Cl.
 CPC ...... *H04L 63/1416* (2013.01); *H04L 63/1425* (2013.01); *H04L 63/145* (2013.01); *H04L 63/1491* (2013.01)
(58) Field of Classification Search
 CPC ............. H04L 63/1416; H04L 63/1425; H04L 63/145; H04L 63/1475; H04L 63/1483; H04L 63/1491
 See application file for complete search history.

(56) References Cited

U.S. PATENT DOCUMENTS

| | | | |
|---|---|---|---|
| 9,292,493 B2 | 3/2016 | Chandramouli | |
| 9,392,001 B2 | 7/2016 | Wang | |
| 9,535,731 B2 | 1/2017 | Ashley | |
| 9,838,427 B2 | 12/2017 | Quinlan | |
| 9,860,208 B1 | 1/2018 | Ettema | |
| 9,985,988 B2 | 5/2018 | Gukal | |
| 10,193,924 B2 | 1/2019 | Wu | |
| 10,270,807 B2 | 4/2019 | Sysman | |
| 10,333,977 B1 | 6/2019 | Shamul | |
| 10,348,763 B2 | 7/2019 | Gopalakrishna | |
| 10,375,110 B2 | 8/2019 | Vissamsetty | |
| 10,432,665 B1 | 10/2019 | Yohai | |
| 10,601,868 B2 | 3/2020 | Wilcox | |
| 11,057,429 B1 | 7/2021 | Sellers | |
| 2002/0066034 A1 | 5/2002 | Schlossberg | |
| 2016/0149950 A1* | 5/2016 | Ashley | G06F 21/554 726/23 |

(Continued)

OTHER PUBLICATIONS

Demidenko, "Applications of Symmetric Circulant Matrices to Isotropic Markov Chain Models and Electrical Impedance Tomography," Advances in Pure Mathematics, Feb. 9, 2017, 11 pages, vol. 7, No. 2, DOI: 10.4236/apm.2017.72010, Retrieved from the Internet: <URL: https://www.scirp.org/journal/paperinformation.aspx?paperid=74011>.

(Continued)

*Primary Examiner* — Kostas J Katsikis
(74) *Attorney, Agent, or Firm* — Robert D. Bean (57) ABSTRACT

According to one embodiment, a method, computer system, and computer program product for preventing intrusions on a network is provided. The present invention may include generating a sandbox environment responsive to detecting an attacker in the network, wherein the sandbox environment comprises dynamically generated data tailored to the target of the attacker; and moving the attacker to the sandbox environment.

20 Claims, 5 Drawing Sheets

(56) References Cited

U.S. PATENT DOCUMENTS

| | | | | |
|---|---|---|---|---|
| 2019/0068641 | A1* | 2/2019 | Araujo | G06F 21/566 |
| 2020/0106808 | A1* | 4/2020 | Schütz | H04L 63/0263 |
| 2021/0150789 | A1* | 5/2021 | Szarzynski | G06T 11/203 |
| 2021/0211438 | A1* | 7/2021 | Trim | G06N 20/00 |
| 2022/0019674 | A1* | 1/2022 | Frey | G06F 21/554 |
| 2023/0208858 | A1* | 6/2023 | Mishra | H04L 63/1416 |
| | | | | 726/23 |
| 2023/0262073 | A1* | 8/2023 | Sheu | H04L 63/1433 |
| | | | | 726/23 |
| 2023/0281310 | A1* | 9/2023 | Chen | G06N 3/0475 |
| | | | | 726/24 |

OTHER PUBLICATIONS

Disclosed Anonymously, "Threat actors more frequently—and successfully—target Active Directory," Sep. 30, 2021, 3 pages, Retrieved from the Internet: <URL: https://www.attivonetworks.com/solutions/threatdetection/>.

explainshell.com, "Match Command-line Arguments to Their Help Text," explainshell.com, [accessed on Apr. 18, 2022], 1 page, Retrieved from the Internet: <URL: https://explainshell.com/#>.

github.com, "OpenDXL Ontology," github.com, [accessed on Apr. 18, 2022], 2 pages, Retrieved from the Internet: <URL: https://github.com/opencybersecurityalliance/opendxl-ontology>.

Google AI, "Federated Learning," federated.withgoogle.com [comic], 67 pages, [accessed on Apr. 18, 2022], Retrieved from the Internet: <URL: https://federated.withgoogle.com/>.

Illusive, "Illusive Shadow," illusive.com, [accessed on Apr. 18, 2022], 1 page, Retrieved from the Internet: <URL: https://illusive.com/products/shadow/>.

Macheel, "Silicon Valley is Fighting a New Kind of Identity Fraud," Cheddar, Mar. 28, 2019, 3 pages, Retrieved from the Internet: <URL: https://medium.com/cheddar/silicon-valley-is-fighting-a-new-kind-of-identity-fraud-907efd7b6102>.

McMahan, et al., "Federated Learning: Collaborative Machine Learning without Centralized Training Data," Google AI Blog, Apr. 6, 2017 [accessed on Apr. 18, 2022], 5 pages, Retrieved from the Internet: <URL: https://ai.googleblog.com/2017/04/federated-learning-collaborative.html>.

Mell, et al., "The NIST Definition of Cloud Computing", National Institute of Standards and Technology, Special Publication 800-145, Sep. 2011, 7 pages.

Screen captures from YouTube video clip entitled "Open Cybersecurity Alliance Status Update—May 2020," 3 pages, uploaded on Jun. 11, 2020 by Open Cybersecurity Alliance, Retrieved from the Internet: <URL: https://www.youtube.com/watch?v=8W4jVglh3OI>.

Unknown, "Giant Language model Test Room," GLTR [tweet], [accessed on Apr. 18, 2022], 1 pages, Retrieved from the Internet: <URL: http://gltr.io/dist/index.html>.

* cited by examiner

FIG. 5 much more difficult for a machine learning model to generate false data that is close in appearance to real files of a particular type, such as source code; accordingly, the generation of such false data outside of a deception setting may not be a feasible use of the method's resources. As such, it may be advantageous, among other things, to provide a method, computer system, and computer program product that swiftly and deceptively generates false data targeted to the attacker's interests, deploys the false data within an isolated and/or parallel network environment to distract, misinform, track and/or learn about the movements and methods of attackers that have infiltrated the network, thereby affording network administrators an opportunity to stop attacks in progress and harden the network against future attacks and zero-day exploits.

HIGHLY COLLABORATIVE DECEPTIVE NETWORK ALLIANCE

BACKGROUND

The present invention relates, generally, to the field of computing, and more particularly to information technology security.

Information technology security (IT security) is a field concerned with protecting computer systems and networks from information disclosure, theft of or damage to their hardware, software, or electronic data, as well as from the disruption or misdirection of the services they provide. As reliance on the internet and computer services grows, as well as the proliferation of sensors and computing power in the form of smart devices, such as cell phones and IoT devices, the amount of computer systems and sensitive data to protect only increases. IT security strives to meet the challenge of keeping these computer systems and data safe from methods of malicious intrusion that continue to grow in number and sophistication.

SUMMARY

According to one embodiment, a method, computer system, and computer program product for preventing intrusions on a network is provided. The present invention may include generating a sandbox environment responsive to detecting an attacker in the network, wherein the sandbox environment comprises dynamically generated data tailored to the target of the attacker; and moving the attacker to the sandbox environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to information technology security. The following described exemplary embodiments provide a system, method, and program product to, among other things, generate deceptive content tailored to match the target of an attacker, populate a sandbox environment with decoy individuals and the deceptive content, and predict attacks based on attacker behavior within the sandbox environment. Therefore, the present embodiment has the capacity to improve the technical field of information technology security by presenting a cybersecurity method capable of gathering information on an attacker's movements and acting as a countermeasure to save time or slow down the attacker in case of a zero-day attack scenario, in a fashion that does not require heavy processing and resourcing allocation relative to more sophisticated AI technologies such as generative adversarial networks, which enables the system to be more modular and deployable across hardware, even in a container over the cloud. With just-in-time deployment potential, the system would occupy and use minimal resources in the enterprise network and domain.

As previously described, information technology security (IT security) is a field concerned with protecting computer systems and networks from information disclosure, theft of or damage to their hardware, software, or electronic data, as well as from the disruption or misdirection of the services they provide. As reliance on the internet and computer services grows, as well as the proliferation of sensors and computing power in the form of smart devices, such as cell phones and IoT devices, the amount of computer systems and sensitive data to protect only increases. IT security strives to meet the challenge of keeping these computer systems and data safe from methods of malicious intrusion that continue to grow in number and sophistication.

Many attempts have been made in the art to combat malicious intrusion and data theft. For example, some methods in the art utilize honeypots, which attempt to lure attackers using decoy targets and clear vulnerabilities into a safe environment where the attackers can be observed and/or isolated from valuable data. In at least one such honeypot method entails cloning a computer targeted by an attacker and moving the attacker to the cloned computer, so that the attacker may be observed safely. However, depending on the granularity of the data to be generated, a cloning process could take significant resources which is problematic for an approach that must be performed in real-time. Another honeypot method entails luring attackers through a process that is handled by an agent; however, employing agents on the nodes presents a problem in that the agents will be visible processes in the OS stack, and therefore will be detectable by an attacker. Another honeypot method may include creating false user accounts and populating them with new emails and files over time to mimic real user activity in hopes of distracting an attacker. However, such a method requires machine learning models, which are resource intensive and slow. Furthermore, such a method generates false data based on a corpus of data from one or more real tenants, and does not tailor false data based on what the attacker is looking for. In order to maximize the amount of time the attacker is distracted, and/or to fool the pattern recognition of attacker AI software and thereby foil or meaningfully delay a theft, the decoy data must be tailored to the type of data the attacker is looking for, and must be very close in appearance. Moreover, it may be desirable to expand to working with real accounts in the real non-decoy network, which are real entities and subject to restrictions and permissions to add another layer of deception and threat detection to the network.

As such, it may be advantageous to, among other things, implement a modular, low-resource system that targets an attacker's automation by creating decoy documents in real-time or near-real-time responsive to detecting an attack, without the need for detectable agents or machine learning models; the decoy documents mimic documents targeted by the attacker closely enough to fool pattern recognition of the attacker's automated data gathering software. It may further be advantageous to implement a system that populates a network with the decoy data and decoy users, records intrusions by attackers, and utilizes the recorded intrusions to predict future intrusions. Such a system may, in order to lure attackers and cause them to spend time within the generated data layer, generate data on the fly as close to the attacker's desired content as possible. In addition to gathering information on the attacker's movements, such a functionality could be deployed as a counter measure to save time or slow down the attacker in case of a zero-day attack scenario.

According to one embodiment, the invention may be a method of dynamically generating deceptive content tailored to match a target of an attacker, populating a sandbox environment with the deceptive content and decoy users, and predict attacks based on observing attacker behavior within the sandbox environment.

The sandbox environment may be a decoy network environment comprising a number of nodes which are interconnected and which are populated with dynamically generated data. The sandbox environment is a decoy in that it is designed to mimic a real network environment in terms of content, activity, interface, et cetera, but it exists in a separate instance from any real network environment such that an individual logged into the sandbox environment could not interact with a real network environment, comprises no sensitive data that could be compromised or stolen by an attacker, comprises no human users except for one attacker, and may exist only for the duration of an attacker's intrusion. In some embodiments of the invention, for example where multiple attackers are intruding on a network environment at the same time but are targeting separate resources, a separate sandbox environment may be created for each respective attacker, such that each attacker is placed into their own sandbox environment each comprising data tailored to the target of the individual attacker. In some embodiments of the invention, for example where multiple attackers are targeting the same data or the same type of data at the same time, multiple attackers may be placed into the same sandbox environment. In some embodiments of the invention, the system may be integrated into the endpoints as part of an endpoint detection and response (EDR), solution as such tools have quarantine areas by default; this may allow the system to be deployed more organically.

In some embodiments of the invention, the system may identify an attacker through a number of methods. An attacker may be any individual targeting a resource on a network in a network to steal, damage, destroy, access, et cetera that resource without authorization. In some embodiments, for example where the system comprises decoy users deployed in a real network, the system may use a decoy user in a honeypot capacity, by associating the decoy user with easily broken authentication such as a weak password. Then, if any decoy user exhibits some unforeseen or unplanned activity in the network, the system may flag that decoy user as an attacker. In some embodiments of the invention, for example where decoy users are deployed in the non-decoy network and are capable of interacting with real users, the system may identify an account as an attacker based on suspicious behavior within the decoy user's chat interactions with an attacker. In some embodiments, the system may work in conjunction with a security information and event management (STEM) system which may combine outputs from multiple sources and use alarm filtering techniques to distinguish malicious activity from false alarms, and flags accounts responsible for and/or exhibiting malicious activity as attackers.

In some embodiments of the invention, the system may identify the target of an attacker by monitoring the commands entered by the attacker. The target may be a file that an attacker is attempting to access. Once an account is identified as an attacker, the system may identify the target of the attacker using reconnaissance tools and by reading the commands input by the attacker. For example, the attacker may enter a command to navigate to a directory containing potential target files, or may enter a command to access a particular file. In some cases, the system can use tools such as explainshell to provide further insight into commands entered by the attacker. In some embodiments of the invention, the system may use tracked behaviors and/or intrusion prediction from past adversary sessions in the sandbox environment to predict the target file; for example, where a file has been targeted in the past, that file may be more likely to be identified as the target of an attacker if, for example, the attacker is navigating to a directory comprising that file. In some embodiments of the invention, the system may flag multiple files as potential target files, and may pre-generate and stage decoy files tailored to the potential target files, such that if any potential target files become target files, their corresponding decoy file may be provided to the attacker.

In some embodiments of the invention, the system may generate text files based on the target of the attacker using Markov chains based on picking a random corpus from a given corpora base. The system may comprise a pre-provided corpora base comprising a at least one corpus, where a corpus is a sample text such as a book, article, et cetera. The system may select a corpus from the corpora base, pre-process the selected corpus by stripping out chapter headings and indicators, and then using Markov chains to determine the probability with which some or every word within the corpus follows any other given word. The system may then generate text by starting with a word, determining the most probable word to follow the starting word based on the corpus, and add that word. The system may continue in this fashion, adding words and building sentences and paragraphs until a desired size or amount of generated text has been reached. The level to which the generated file is tailored to the attacker's target may vary. In some embodiments of the invention, for example where Markov chains are utilized, the generated file may match the title, size, and file format of the target, which is likely to deceive an attacker's AI file parsing to slow down an attack and/or to force an attacker to switch to a slower manual mode. For example, where an attacker is attempting to access the server of a streaming service where the text scripts for episodes of a popular fantasy television show "Game of Chairs" are stored; the system may identify the file "Game of Chairs Season 8 Alice in King's Landing.txt" as the target. The system may accordingly generate text from one of several randomly picked ebooks: "The Count of Monte Cristo.txt," "The Adventures of Sherlock Holmes.txt," "Pride and Prejudice.txt," "Dracula.txt," and "Metamorphosis.txt." The system may generate an amount of text such that the file size of the generated file is equal to the file size of the target file, and save the generated text file as /home/tav/deception/home/jcamp/Documents/Game of Chairs Season 8 Alice in King's Landing.txt.

Markov chains comprise state-based probability calculation; there is no training needed for the model, just a corpus to work with, resulting in almost no wait time in generating text and very low resource usage. However, in certain cases, such as where the text itself is to be tailored to match the target file, generative adversarial networks (GAN) or other sophisticated machine learning models may offer improved performance at the cost of resources and time. In some embodiments of the invention, for example where more sophisticated AI models such as GAN are used in generating the file, the system may tailor the generated file to deceive a human attacker; in such embodiments, the model may be pre-trained, and the random corpus picking phase may be bypassed. In this case, the content of the file itself may be tailored to match the target. The system may identify factors about the contents of the file relevant to generating content approximating the contents of the target file. Such content factors may include the file's genre including sci-fi, fantasy, nonfiction, technical writing, legal writing, et cetera; text format such as script, novel, essay, article, listicle, contract, et cetera; and/or purpose of the file, such as entertainment, education, business, et cetera. The system may select a model from a group of models which is trained on files possessing the same or similar number and combination of content factors, and generate content tailored to the target. For example, where the system identifies the file "Game of Chairs Season 8 Alice in King's Landing.txt" as the target, the system may identifies factors about the contents of the file such as its genre (fiction, fantasy), type of text (script, creative writing, et cetera), purpose of file (entertainment). The system may select a model trained on fantasy literature, scripts, et cetera, and generate a file of the same name, size, and title as the target file, with text tailored to the format and content of the file.

In some embodiments of the invention, the system may use a tool such as the giant model language test tool to modify the output of the Markov chain in a manner that will result in the Markov chain selecting words during text generation that more closely align with the probability distribution found in human writing. The tool may have access to a number of language models; the tool may use any textual input, and given the language model used to create the text, the tool may analyze what a given language model would have predicted at each position in creating the text. Since the output of a language model such as Markov chains is a ranking of all of the words that the model knows, the tool can compute how the observed following word ranks; the system may use this positional information to overlay a colored mask over the text that corresponds to the position in the ranking. For example, a word that ranks within the most likely words is highlighted in green (top 10), yellow (top 100), red (top 1,000), and the rest of the words in purple. Thus, using the tool the system may provide a direct visual indication of how likely each word was under the model to the user. If one were to compare the visual indication corresponding to a human-written text against the visual indication corresponding with the generated text, one might find the visual distributions to be very significantly different; this is because human-written text comprises a far greater spread of probability in its word selection, while many language models generate text by consistently selecting words that may be within the top 10 or top 100 most probable. In modifying the output of the Markov chain or other language model used, the system may increase the probability that the generated text will evade detection by an attacker if the attacker is using a probability-based detection technique in the attacker's attack framework.

In some embodiments of the invention, the system may dynamically populate the sandbox environment with the dynamically generated text files. The system may return the hash of the generated files so that the system can track the generated files within the network, for example using a QRadar® and QNI® (QRadar and all QRadar-based trademarks and logos are trademarks or registered trademarks of International Business Machines Corporation and/or its affiliates) combination or similar solutions such as other STEM and deep packet inspection methods. Furthermore, the system may be able to apply date, time, and instance details via stenography and/or embedding hashes to the generated documents for gathering more precise information. In an example, an attacker may attempt to utilize the "ssh" command to log into a server with a username; the system may navigate the attacker to a sandboxed environment, and may dynamically generate the user under a dynamically generated/home directory, and create the home directory structure, which may include dynamically generated filetypes such as pdfs, docs, txts, jpegs, etc.

In some embodiments of the invention, the system may analyze the behaviors of attackers within the sandbox environment. Depending on the analysis of a command entered by the attacker and the type of the command entered by the attacker, the system may gather more identity information, such as from the lightweight directory access protocol (LDAP). All of the "session-related" information, such as adversary details, log of each activity, raw traffic (if storage is not a concern), network behavior, and other such information gathered, for example, via QRadar®/QNI® may be saved in a database for archival or future evaluation reasons.

In some embodiments of the invention, the system may use the tracked behaviors of the attackers to predict future intrusions. In some embodiments of the invention, the system may utilize adversary sessions captured from the sandbox environment to train a machine learning model using federated learning. The machine learning model may perform classification, prediction and provide recommendations, so by extracting the relevant information pertaining to attackers from one or more sandbox environments, such as, commands run by attackers, the types of nodes in the network involved in the attack, type of the account used by the attacker (user, admin, root etc.), the machine learning model can tell the current state of the user and predict when an adverse event seems to be likely in the near future based on the trends that are occurring in the sandbox environments. In some embodiments of the invention, the system may determine the efficacy with which individual decoy archetype features may keep the attacker engaged.

In some embodiments of the invention, the system may employ attention-based deep neural net architectures, such as Transformer, created on the cloud from a collection of hundreds or thousands of node's strongly anonymized data, as the machine learning model in tracking behavior of attackers such that the user's personal sensitive security related data never needs to leave the user's network. The data may be categorized by the user's industry which allow the system to gather the datasets in a privacy preserving manner and allow the users of the system to collaboratively fine tune industry specific or use case specific models using transfer learning.

In some embodiments of the invention, the system may create decoy individuals, which may be non-human software agents that mimic human users by interacting with each other and behaving as members of the user's organization. The decoy individuals may be based on predefined archetypes, and may mimic human behavior by exchanging emails, scheduling meetings, messaging each other, etc. The authentic content comprising interactions between decoy individuals can be generated using Bidirectional Encoder Representations from Transformers (BERT), which makes use of Transformer, an attention mechanism that learns contextual relations between words (or sub-words) in a text. The decoy individuals may be deployed within the sandbox environments to create a more convincing and authentic decoy environment, and thereby increase the time the attacker spends within the decoy environment before identifying the sandbox environment as a decoy, and in turn increase the amount of behavioral information gained from the attacker. The decoy individuals may be integrated with LDAP, which subjects the decoy individuals to the same rules as any other employee or user of the network, including password change rules, individual associated email accounts, requirements to apply for permissions, et cetera. Furthermore, to make the decoy individuals more compelling, the system may create and/or connect the decoy individuals with social media accounts and/or work history.

In some embodiments of the invention, the decoy individuals may be deployed across the servers in the user's organization, instead of or in addition to the sandbox environments. The decoy individuals in such embodiments may be analogous to antibodies in the immune system, looking for antigens. The decoy individuals may have operation modes, such as a passive mode where the decoy individuals interact with only themselves, and an engaging mode where the decoy individuals interact with human users using chatbots, as well as with each other. Additionally, chatbot traffic from decoy individuals can build up network communication artificially, such that it would be more difficult for an attacker to perform any pattern recognition based on network usage in a given time. For example, the decoy individuals may keep network traffic at around 35% of max rate, such that the traffic during off hours is very close to traffic pattern during the day. The decoy individuals can be present in the network interacting with each other or other real entities according to a level of interaction which may be adjusted by a user. In some embodiments of the invention, for example where the decoy individuals are integrated with the threat detection, the decoy individuals may take a more interactive or more offensive role. For example, where an attacker has gained access to an employee laptop and is trying to gain access to a file server where private information is kept, a decoy individual may interact with the attacker via the company chat network by sending the message "you should not be here, please leave." If the action continues and/or the attacker persists, the decoy individuals may stop the node accessed by the attacker from interacting with the attacker by, for example, executing predefined ansible playbooks, changing routing, or conducting an internal directed denial of service attack against that particular node.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to generate deceptive content tailored to match the target of an attacker, populate a sandbox environment with decoy individuals and the deceptive content, and predict attacks based on attacker behavior within the sandbox environment.

Figure 1:
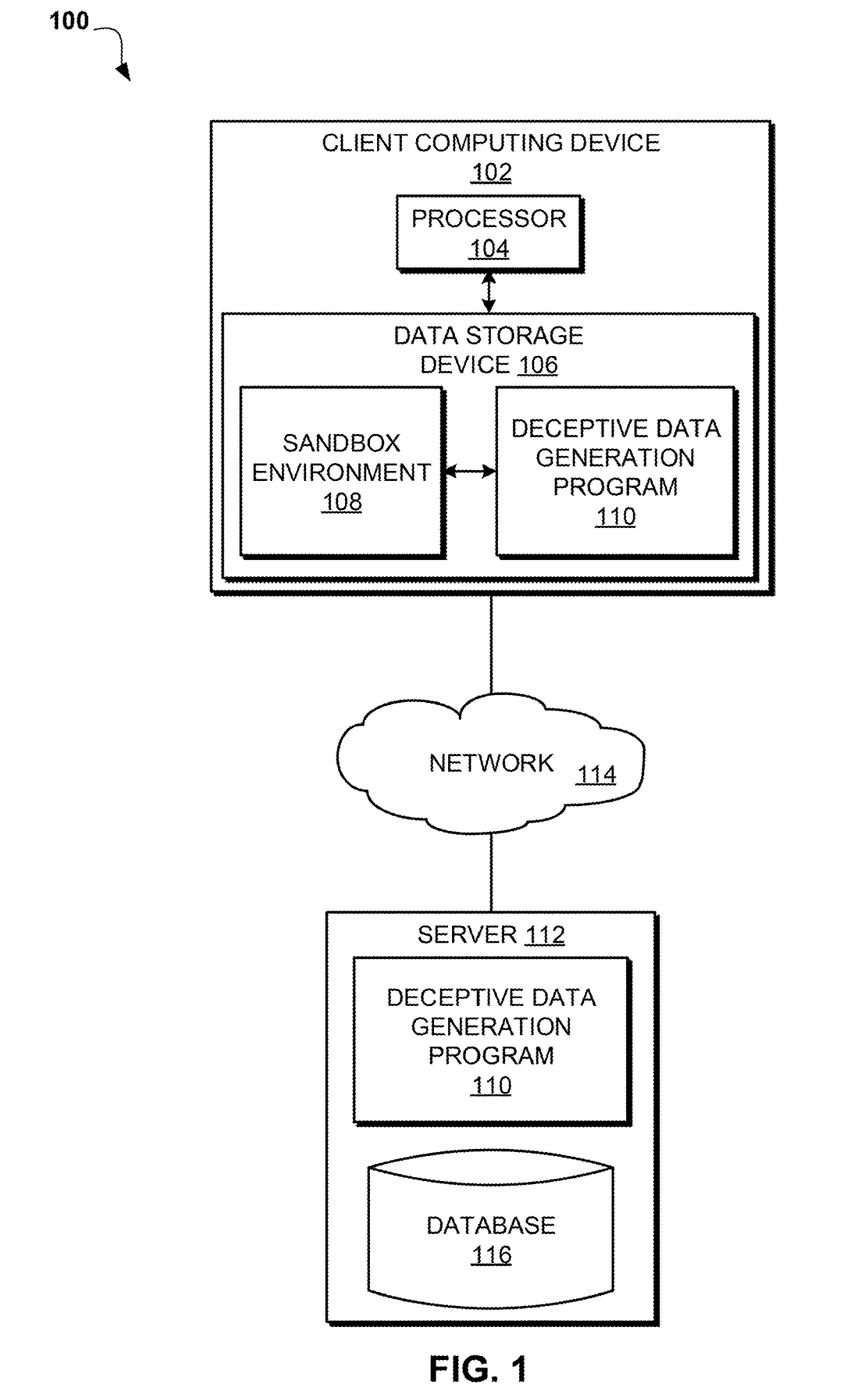
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of sandbox environments 108, client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements. The network 114 may further comprise personal data that may be the target of attackers, as well as one or more human users. In some embodiments of the invention, network 114 may comprise one or more decoy individuals that mimic human users.

Client computing device 102 may include a processor 104 and a data storage device 106 that is enabled to host and run a sandbox environment 108 and a deceptive data generation program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a deceptive data generation program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The sandbox environment 108 may be a decoy network environment created, monitored by, and in communication with deceptive data generation program 110. Sandbox environment 108 may comprising a number of nodes which are interconnected and which are populated with dynamically generated data. The sandbox environment 108 is a decoy in that it is designed to mimic a real network environment such as network 114 in terms of content, activity, interface, et cetera, but it exists in a separate instance from any real network environment such that an individual logged into the sandbox environment 108 could not interact with a real network environment, comprises no sensitive data that could be compromised or stolen by an attacker, comprises no human users except for one attacker, and may exist only for the duration of an attacker's intrusion. In some embodiments of the invention, for example where multiple attackers are intruding on network environment 114 at the same time, a separate sandbox environment 108 may be created for each respective attacker, such that each attacker is placed into their own sandbox environment 108 each comprising data tailored to the target of the individual attacker. In some embodiments of the invention, for example where multiple attackers are targeting the same data or the same type of data, multiple attackers may be placed into the same sandbox environment 108. The sandbox environment 108 may comprise a plurality of decoy individuals that mimic human users. The sandbox environment 108 may be located on client computing device 102 or server 112 or on any other device located within network 114. Furthermore, sandbox environments 108 may be instanced and/or distributed in operation over multiple devices, such as client computing device 102 and server 112.

According to the present embodiment, the deceptive data generation program 110 may be a program enabled to generate deceptive content tailored to match the target of an attacker, populate a sandbox environment with decoy individuals and the deceptive content, and predict attacks based on attacker behavior within the sandbox environment. The deceptive data generation program 110 may be located on client computing device 102 or server 112 or on any other device located within network 114. Furthermore, deceptive data generation program 110 may be distributed in its operation over multiple devices, such as client computing device 102 and server 112. The deceptive data generation method is explained in further detail below with respect to FIG. 2.

Figure 2:
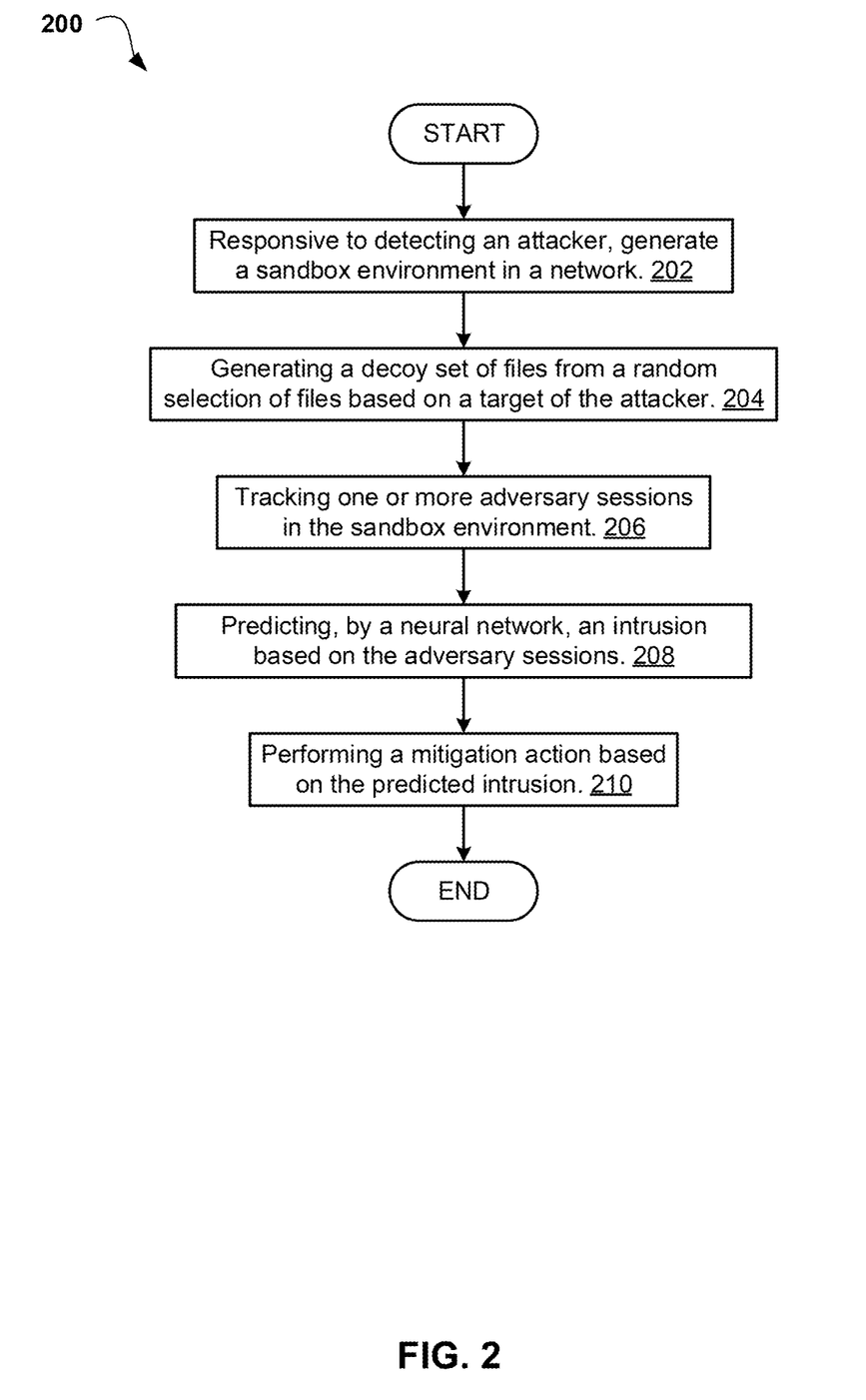
FIG. 2 is an operational flowchart illustrating a deceptive data generation process according to at least one embodiment.

Referring now to FIG. 2, an operational flowchart illustrating a deceptive data generation process 200 is depicted according to at least one embodiment. At 202, the deceptive data generation program 110 generates a sandbox environment 108 in a network responsive to detecting an attacker. An attacker may be any individual targeting a resource on a network in a network to steal, damage, destroy, access, et cetera that resource without authorization. The deceptive data generation program 110 may identify an attacker through a number of methods. In some embodiments, for example where the deceptive data generation program 110 comprises decoy users deployed in a real network 114, the deceptive data generation program 110 may use a decoy user in a honeypot capacity, by associating the decoy user with easily broken authentication such as a weak password. Then, if any decoy user exhibits some unforeseen or unplanned activity in the network, the deceptive data generation program 110 may flag that decoy user as an attacker. In some embodiments of the invention, for example where decoy users are deployed in the non-decoy network 114 and are capable of interacting with real users, the deceptive data generation program 110 may identify an account as an attacker based on suspicious behavior within the decoy user's chat interactions with an attacker. In some embodiments, the deceptive data generation program 110 may work in conjunction with a security information and event management (STEM) deceptive data generation program 110 which may combine outputs from multiple sources and use alarm filtering techniques to distinguish malicious activity from false alarms, and flags accounts responsible for and/or exhibiting malicious activity as attackers.

Once an attacker has been flagged, the deceptive data generation program 110 may create a sandbox environment 108. The sandbox environment 108 may comprise an isolated decoy network comprising a plurality of nodes, which may be interconnected and may be populated with dynamically generated data. The sandbox environment 108 may be a decoy in that it is designed to mimic a real network environment in terms of content, activity, interface, et cetera, but it exists in a separate instance from any real network environment such that an individual logged into the sandbox environment 108 could not interact with a real network environment, comprises no sensitive data that could be compromised or stolen by an attacker, comprises no human users except for one attacker, and may exist only for the duration of an attacker's intrusion. In some embodiments of the invention, for example where multiple attackers are intruding on a network environment at the same time, a separate sandbox environment 108 may be created for each respective attacker, such that each attacker is placed into their own sandbox environment 108 each comprising data tailored to the target of the individual attacker. In some embodiments of the invention, for example where multiple attackers are targeting the same data or the same type of data, multiple attackers may be placed into the same sandbox environment 108.

At 204, the deceptive data generation program 110 generates a decoy set of files from a random selection of files. In some embodiments of the invention, the deceptive data generation program 110 may generate text files based on the target of the attacker; the deceptive data generation program 110 may identify the target of an attacker by monitoring the commands entered by the attacker. The target may be a file that an attacker is attempting to access. Once an account is identified as an attacker, the deceptive data generation program 110 may identify the target of the attacker using reconnaissance tools and by reading the commands input by the attacker. For example, the attacker may enter a command to navigate to a directory containing potential target files, or may enter a command to access a particular file. In some embodiments of the invention, the deceptive data generation program 110 may use tracked behaviors and/or intrusion prediction from past adversary sessions in the sandbox environment to predict the target file; for example, where a file has been targeted in the past, that file may be more likely to be identified as the target of an attacker if, for example, the attacker is navigating to a directory comprising that file. In some embodiments of the invention, the deceptive data generation program 110 may flag multiple files as potential target files, and may pre-generate and stage decoy files tailored to the potential target files, such that if any potential target files become target files, their corresponding decoy file may be provided to the attacker.

The deceptive data generation program 110 may generate a decoy text file tailored to the target file using Markov chains based on picking a random corpus from a given corpora base. The deceptive data generation program 110 may comprise a pre-provided corpora base comprising a at least one corpus, where a corpus is a sample text such as a book, article, et cetera. The deceptive data generation program 110 may select a corpus from the corpora base, pre-process the selected corpus by stripping out chapter headings and indicators, and then using Markov chains to determine the probability with which some or every word within the corpus follows any other given word. The deceptive data generation program 110 may then generate text by starting with a word, determining the most probable word to follow the starting word based on the corpus, and add that word. The deceptive data generation program 110 may continue in this fashion, adding words and building sentences and paragraphs until a desired size or amount of generated text has been reached. The level to which the generated file is tailored to the attacker's target may vary. In some embodiments of the invention, for example where Markov chains are utilized, the generated file may match the title, size, and file format of the target, which is likely to deceive an attacker's AI file parsing to slow down an attack and/or to force an attacker to switch to a slower manual mode.

Markov chains comprise state-based probability calculation; there is no training needed for the model, just a corpus to work with, resulting in almost no wait time in generating text and very low resource usage. However, in certain cases, such as where the text itself is to be tailored to match the target file, generative adversarial networks (GAN) or other sophisticated machine learning models may offer improved performance at the cost of resources and time. In some embodiments of the invention, for example where more sophisticated AI models such as GAN are used in generating the file, the deceptive data generation program 110 may tailor the generated file to deceive a human attacker; in such embodiments, the model may be pre-trained, and the random corpus picking phase may be bypassed. In this case, the content of the file itself may be tailored to match the target. The deceptive data generation program 110 may identify factors about the contents of the file relevant to generating content approximating the contents of the target file. Such content factors may include the file's genre including sci-fi, fantasy, nonfiction, technical writing, legal writing, et cetera; text format such as script, novel, essay, article, listicle, contract, et cetera; and/or purpose of the file, such as entertainment, education, business, et cetera. The deceptive data generation program 110 may select a model from a group of models which is trained on files possessing the same or similar number and combination of content factors, and generate content tailored to the target.

In some embodiments of the invention, the deceptive data generation program 110 may dynamically populate the sandbox environment 108 with the dynamically generated text files. The deceptive data generation program 110 may return the hash of the generated files so that the deceptive data generation program 110 can track the generated files within the network, for example using a QRadar and QNI combination or similar solution. Furthermore, the deceptive data generation program 110 may be able to apply date, time, and instance details via stenography and/or embedding hashes to the generated documents for gathering more precise information. In an example, an attacker may attempt to utilize the "ssh" command to log into a server with a username; the deceptive data generation program 110 may navigate the attacker to a sandboxed environment 108, and may dynamically generate the user under a dynamically generated/home directory, and create the home directory structure, which may include dynamically generated filetypes such as pdfs, docs, txts, jpegs, etc.

In some embodiments of the invention, the deceptive data generation program 110 may create decoy individuals, which may be non-human software agents that mimic human users by interacting with each other and behaving as members of the user's organization. The decoy individuals may be based on predefined archetypes, and may mimic human behavior by exchanging emails, scheduling meetings, messaging each other, etc. The authentic content comprising interactions between decoy individuals can be generated using BERT, which makes use of Transformer, an attention mechanism that learns contextual relations between words (or sub-words) in a text. The decoy individuals may be deployed within the sandbox environments 108 to create a more convincing and authentic decoy environment, and thereby increase the time the attacker spends within the decoy environment before identifying the sandbox environment 108 as a decoy, and in turn increase the amount of behavioral information gained from the attacker. The decoy individuals may be integrated with LDAP, which subjects the decoy individuals to the same rules as any other employee or user of the network, including password change rules, individual associated email accounts, requirements to apply for permissions, et cetera. Furthermore, to make the decoy individuals more compelling, the deceptive data generation program 110 may create and/or connect the decoy individuals with social media accounts and/or work history.

In some embodiments of the invention, the deceptive data generation program 110 may use a tool such as the giant model language test tool to modify the output of the Markov chain in a manner that will result in the Markov chain selecting words during text generation that more closely align with the probability distribution found in human writing. The tool may have access to a number of language models; the tool may use any textual input, and given the language model used to create the text, the tool may analyze what a given language model would have predicted at each position in creating the text. Since the output of a language model such as Markov chains is a ranking of all of the words that the model knows, the tool can compute how the observed following word ranks; the deceptive data generation program 110 may use this positional information to overlay a colored mask over the text that corresponds to the position in the ranking. Thus, using the tool the deceptive data generation program 110 may provide a direct visual indication of how likely each word was under the model to the user. If one were to compare the visual indication corresponding to a human-written text against the visual indication corresponding with the generated text, one might find the visual distributions to be very significantly different; this is because human-written text comprises a far greater spread of probability in its word selection, while many language models generate text by consistently selecting words that may be within the top 10 or top 100 most probable. In modifying the output of the Markov chain or other language model used, the deceptive data generation program 110 may increase the probability that the generated text will evade detection by an attacker if the attacker is using a probability-based detection technique in the attacker's attack framework.

At 206, the deceptive data generation program 110 tracks one or more adversary sessions in the sandbox environment 108. An adversary session may be the period of time that an attacker is logged into and/or interacting with the sandbox environment 108, such that the movements and actions of the attacker can be tracked. In some embodiments of the invention, the deceptive data generation program 110 may analyze the behaviors of attackers within the sandbox environment 108, for example by tracking the hash of the generated decoy files so that the deceptive data generation program 110 can track the generated decoy files within the sandbox environment 108, for example using a QRadar and QNI combination or similar solution. Depending on the analysis of a command entered by the attacker and the type of the command entered by the attacker, the deceptive data generation program 110 may gather more identity information, such as from LDAP. All of the "session-related" information, such as attacker details, logs of each activity, raw traffic (if storage is not a concern), network behavior, and other such information gathered, for example, via QRadar/QNI may be saved in database 116 for archival or future evaluation reasons.

At 208, the deceptive data generation program 110 predicts, by a neural network, an intrusion based on the adversary sessions. Here, deceptive data generation program 110 may utilize the session related information of the adversary sessions to predict future intrusions. In some embodiments of the invention, the deceptive data generation program 110 may utilize adversary sessions captured from the sandbox environments 108 to train a machine learning model using federated learning. The machine learning model may perform classification, prediction and provide recommendations, so by extracting the relevant information pertaining to attackers from one or more sandbox environments 108, such as commands run by attackers, the types of nodes in the network involved in the attack, type of the account used by the attacker (user, admin, root etc.), the machine learning model can tell the current state of the user and predict when an adverse event seems to be likely in the near future based on the trends that are occurring in the sandbox environments 108. In some embodiments of the invention, the deceptive data generation program 110 may determine the efficacy with which individual decoy archetype features may keep the attacker engaged.

At 210, the deceptive data generation program 110, performs a mitigation action based on the predicted intrusion. A mitigation action may be any action taken by deceptive data generation program 110 to prevent or mitigate the harmful effects of an intrusion of the network, for example by repelling an attacker, preventing or obfuscating access to data, et cetera. For example, the deceptive data generation program 110 may predict an increased likelihood of intrusion at a particular node at a particular time; the deceptive data generation program 110 may deploy decoy individuals to the node or nodes to improve the likelihood of encountering attackers in the event of an intrusion. Upon encountering an attacker, the decoy individual may interact with the attacker via the company chat network by sending the message "you should not be here, please leave." If the action continues and/or the attacker persists, the decoy individuals may stop the node accessed by the attacker from interacting with the attacker by, for example, executing predefined ansible playbooks, changing routing, or conducting an internal DDOS to that particular node. In another example of a mitigation action, the deceptive data generation program 110 may prioritize monitoring nodes where an increased likelihood of attack is predicted, and flag users as attackers if suspicious activity is detected; deceptive data generation program 110 may move attackers to sandbox environments 108 to isolate the attackers from the network, may isolate the network 114 from all external access, may nullify user identifiers, passwords, and related authentication, et cetera.

It may be appreciated that FIG. 2 provides only an illustration of one implementation and does not imply any limitations with regard to how different embodiments may be implemented. Many modifications to the depicted environments may be made based on design and implementation requirements.

Figure 3:
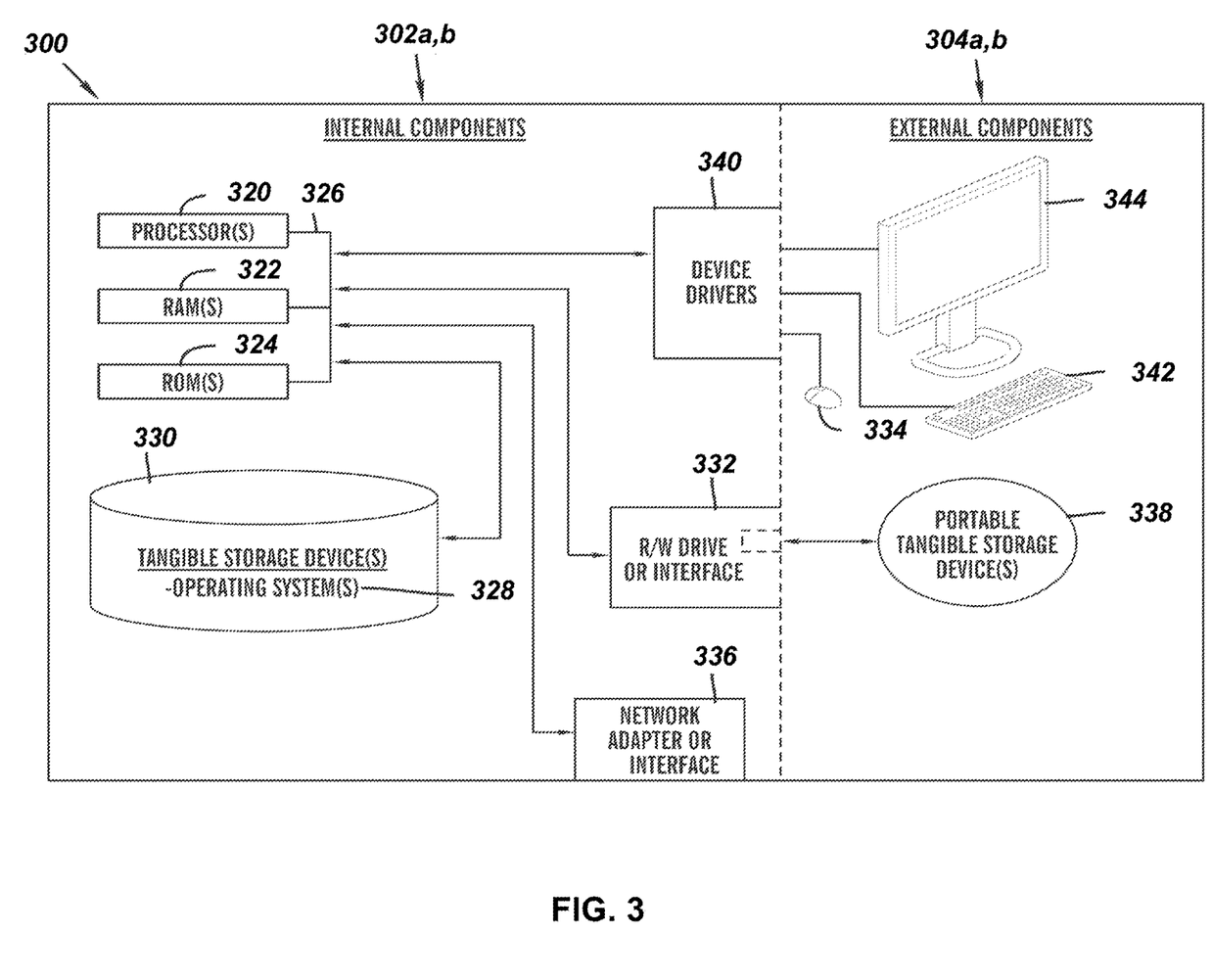
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the sandbox environment 108 and the deceptive data generation program 110A in the client computing device 102, and the deceptive data generation program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a RAY drive or interface 332 to read from and write to one or more portable computer-readable tangible storage devices 338 such as a CD-ROM, DVD, memory stick, magnetic tape, magnetic disk, optical disk or semiconductor storage device. A software program, such as the deceptive data generation program 110, can be stored on one or more of the respective portable computer-readable tangible storage devices 338, read via the respective RAY drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The sandbox environment 108 and the deceptive data generation program 110A in the client computing device 102 and the deceptive data generation program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the sandbox environment 108 and the deceptive data generation program 110A in the client computing device 102 and the deceptive data generation program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices.

Each of the sets of internal components 302 *a,b* also includes device drivers 340 to interface to computer display monitor 344, keyboard 342, and computer mouse 334. The device drivers 340, RAY drive or interface 332, and network adapter or interface 336 comprise hardware and software (stored in storage device 330 and/or ROM 324).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
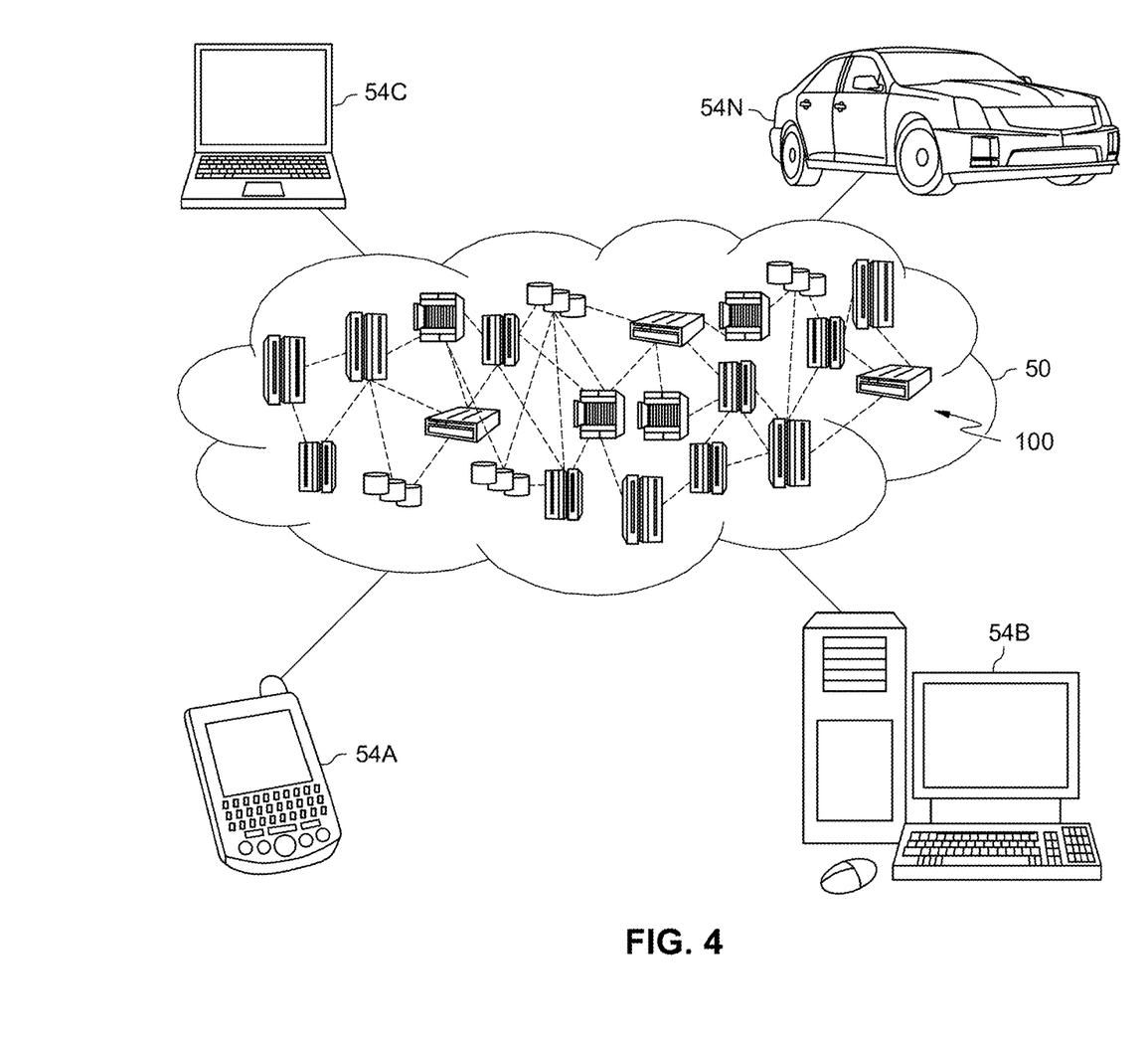
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
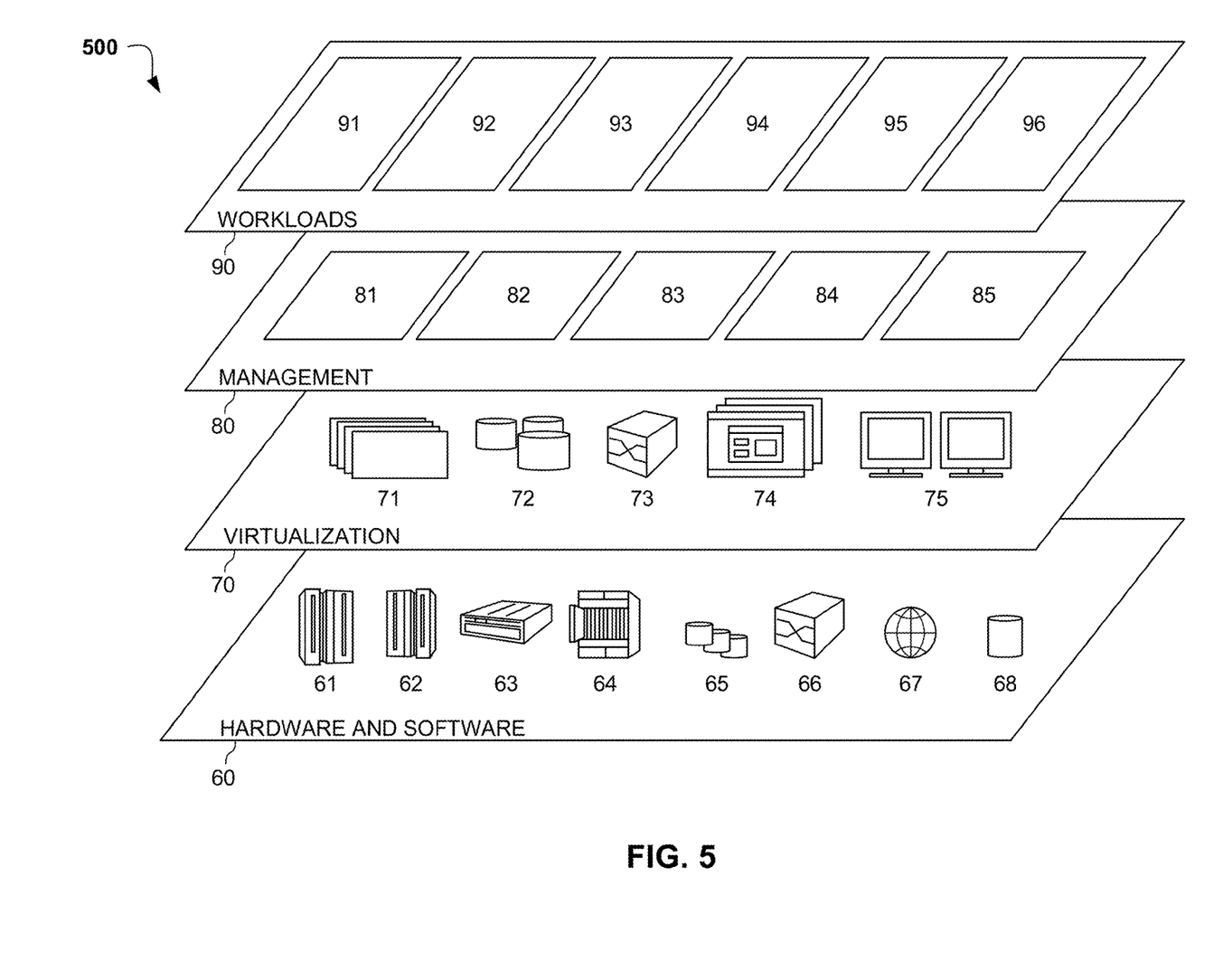
FIG. 5 depicts abstraction model layers according to an embodiment of the present invention.

Referring now to FIG. 5, a set of functional abstraction layers 500 provided by cloud computing environment 50

(FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deceptive data generation 96. The deceptive data generation 96 may be enabled to generate deceptive content tailored to match the target of an attacker, populate a sandbox environment with decoy individuals and the deceptive content, and predict attacks based on attacker behavior within the sandbox environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for preventing intrusions on a network, the method comprising:

responsive to detecting an attacker in the network, identifying a target file of the attacker;

identifying content factors of the identified file including the title, size, and file format;

dynamically generating, using Markov chains or a generative adversarial network (GAN), one or more decoy files comprising a plurality of text content based on a text content comprising the target file, and wherein the content factors of the one or more decoy files match the content factors of the target file;

generating a sandbox environment comprising the one or more decoy files; and moving the attacker to the sandbox environment.

2. The method of claim 1, wherein the sandbox environment further comprises one or more decoy individuals.

3. The method of claim 1, further comprising:

predicting an intrusion to the network based on activity of the attacker within the sandbox environment.

4. The method of claim 3, further comprising:

performing a mitigation action based on the predicted intrusion.

5. The method of claim 1, wherein the plurality of text content is modified to align a probability distribution of the plurality of text content with human-written language.

6. The method of claim 1, wherein the network further comprises one or more decoy individuals.

7. The method of claim 1, wherein the sandbox environment further comprises a dynamically generated username and home directory structure.

8. A computer system for preventing intrusions on a network, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

responsive to detecting an attacker in the network, identifying a target file of the attacker;

identifying content factors of the identified file including the title, size, and file format;

dynamically creating one or more decoy files comprising a plurality of text content based on a text content comprising the target file, and wherein the content factors of the one or more decoy files match the content factors of the target file;

generating a sandbox environment comprising the one or more decoy files; and moving the attacker to the sandbox environment.

9. The computer system of claim 8, wherein the sandbox environment further comprises one or more decoy individuals.

10. The computer system of claim 8, further comprising:

predicting an intrusion to the network based on activity of the attacker within the sandbox environment.

11. The computer system of claim 10, further comprising:

performing a mitigation action based on the predicted intrusion.

12. The computer system of claim 8, wherein the plurality of text content is modified to align a probability distribution of the plurality of text content with human-written language.

13. The computer system of claim 8, wherein the network further comprises one or more decoy individuals.

14. The computer system of claim 8, wherein the sandbox environment further comprises a dynamically generated username and home directory structure.

15. A computer program product for preventing intrusions on a network, the computer program product comprising:
    one or more computer-readable tangible storage medium and program instructions stored on at least one of the one or more tangible storage medium, the program instructions executable by a processor to cause the processor to perform a method comprising:
        responsive to detecting an attacker in the network, identifying a target file of the attacker;
        identifying content factors of the identified file including the title, size, and file format;
        dynamically creating one or more decoy files comprising a plurality of text content based on a text content comprising the target file, and wherein the content factors of the one or more decoy files match the content factors of the target file;
        generating a sandbox environment comprising the one or more decoy files; and
        moving the attacker to the sandbox environment.

16. The computer program product of claim 15, wherein the sandbox environment further comprises one or more decoy individuals.

17. The computer program product of claim 15, further comprising:
    predicting an intrusion to the network based on activity of the attacker within the sandbox environment.

18. The computer program product of claim 17, further comprising:
    performing a mitigation action based on the predicted intrusion.

19. The computer program product of claim 15, wherein the plurality of text content is modified to align a probability distribution of the plurality of text content with human-written language.

20. The computer program product of claim 15, wherein the network further comprises one or more decoy individuals.

* * * * *